United States Patent Office 2,829,161
Patented Apr. 1, 1958

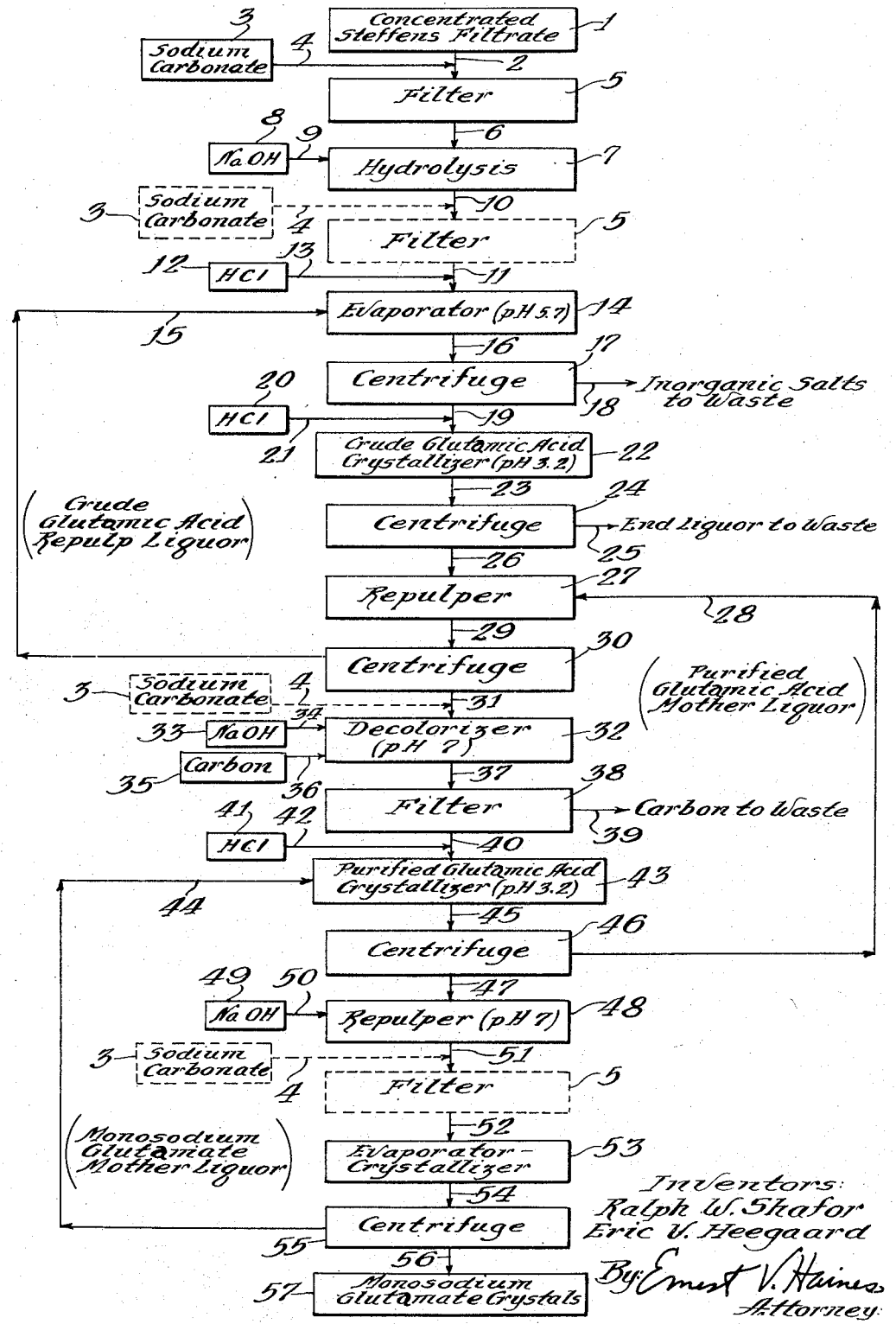

2,829,161

PRODUCTION OF MONOSODIUM GLUTAMATE

Ralph W. Shafor, Los Gatos, and Erik V. Heegaard, Menlo Park, Calif., assignors to International Minerals & Chemical Corporation, a corporation of New York Application November 15, 1955, Serial No. 546,953

6 Claims. (Cl. 260—527)

This invention relates to a process for recovering monosodium glutamate from beet sugar refining liquors, and more particularly, to the recovery of monosodium glutamate in high yields from Steffen's filtrates.

Numerous processes have been proposed for the production and recovery of glutamic acid from Steffen's filtrate and these processes have been utilized to advantage in many locations. In general, monosodium glutamate may be produced in accordance with these processes by dissolving the recovered glutamic acid in water, adjusting the pH of the solution to about neutrality and crystallizing monosodium glutamate from the solution.

However, in the production of monosodium glutamate by a continuous commercial process wherein mother liquors and wash liquors are recycled and reused wherever feasible, considerable difficulty is encountered on occasion in recovering even fair yields of a monosodium glutamate. It has been observed that generally low yields of monosodium glutamate are obtained when mother solutions are of a low degree of purity but even this has not invariably been the case. Frequently, mother solutions containing substantial amounts of impurities give good yields of monosodium glutamate, whereas in certain other instances mother solutions having a relatively high degree of purity give almost negligible yields of monosodium glutamate. High and low yields of monosodium glutamate have been somewhat cyclical even though processing conditions have remained unchanged and it has been unpredictable just when high or low yields of monosodium glutamate would be encountered. There has been a need for a continuous process for producing monosodium glutamate from beet sugar refining liquors which would afford high yields of monosodium glutamate at all times and remove the variations in yields and purities of monosodium glutamate which have been encountered intermittently in the past.

It is an object of the instant invention to provide an improved process for producing monosodium glutamate.

It is a further object of the instant invention to provide a continuous process for producing high yields of high purity monosodium glutamate consistently from liquors containing glutamic acid values.

It is a further object of the instant invention to eliminate certain impurities from Steffen's filtrate which interfere with monosodium glutamate crystallization and recovery.

It is a further object of this invention to provide an improved continuous process for producing monosodium glutamate from beet sugar refining liquors containing calcium.

These and other objects of the instant invention will become more apparent upon a fuller understanding of the invention as hereinafter set forth.

In accordance with this invention, a beet sugar residue, for example Steffen's filtrate, concentrated Steffen's filtrate, etc., is hydrolyzed and monosodium glutamate is crystallized from the hydrolyzate in accordance with the customary procedures with the exception that prior to crystallization of monosodium glutamate from solution, substantially all calcium present is removed from the solution. The calcium may be present in the liquor to be processed for the production of monosodium glutamate as a result of their presence in the beet sugar residue or may have been added in reagent form or otherwise during the processing of the waste residue for the production of monosodium glutamate.

It is now known that Steffen's filtrates vary widely in composition, particularly in regard to the level of calcium concentration, depending upon many factors such as source, supply, manner of handling and storage, etc., prior to processing for monosodium glutamate recoveries. It is also now known that the presence in a monosodium glutamate solution of more than about 0.3% of calcium, expressed as calcium oxide, by weight, retards crystallization of monosodium glutamate, and in a commercial process it is preferable that the concentration of calcium in a monosodium glutamate mother solution be less than about 0.2% before crystallization of monosodium glutamate therefrom.

All references to calcium concentrations herein refer to calcium concentrations expressed in terms of calcium oxide, by weight, and the phrase "substantially complete removal of calcium" from a solution containing glutamic acid values means sufficiently complete removal of calcium to provide a monosodium glutamate mother solution, that is, the solution from which monosodium glutamate is to be crystallized, having a calcium concentration of less than about 0.3%, by weight.

In a continuous commercial process involving recycle of all possible liquors and wash solutions for reuse in the process to provide the most economical utility of reagents, it has been found that failure to remove calcium substantially completely from the process stream results in sufficient build-up of calcium concentration in the monosodium glutamate mother solution to almost entirely prevent any substantial crystallization of monosodium glutamate therefrom. Because in such a continuous process as conventionally carried out commercially no liquors are sent to waste subsequent to the stage to which crude glutamic acid is separated from its mother liquor, usually referred to as glutamic acid end liquor, there is no way for calcium to leave the system (except in accordance with the instant invention), and calcium concentration in the monosodium glutamate mother solution from which monosodium glutamate is ultimately crystallized can in a very short period of time rise until crystallization of monosodium glutamate does not occur in any substantial amount. Whereas normally a commercial process for producing monosodium glutamate from, for example Steffen's filtrate, can remove upwards of 60% to 80% of the monosodium glutamate values in the Steffen's filtrate as monosodium glutamate, it has been found that failure to remove calcium from the process stream can in a short period of time result in such a high calcium concentration in the monosodium glutamate mother solution to reduce recoveries of monosodium glutamate to less than about 10% of the theoretical with no relief possible except that arising from removal of calcium from the solution. In one known instance, a commercial plant having an output of over ten-thousand tons of monosodium glutamate was reduced to an output of about one-thousand tons during the same time period due to the build-up of calcium in the monosodium glutamate mother solution and the consequent failure of monosodium glutamate to crystallize therefrom.

Calcium may be separated from a monosodium glutamate process stream in any convenient manner and at any stage in the process, and the advantageous results of this invention may be attained so long as the calcium is substantially completely removed from the process stream prior to crystallization of monosodium glutamate. Preferably, calcium is removed from beet sugar refining residues prior to hydrolysis thereof in order to avoid incorporation of an additional stage in the conventional monosodium glutamate process. Thus, ordinary beet sugar refining residues are filtered prior to hydrolysis to remove any insoluble impurities and the addition of, for example sodium carbonate, to such a residue prior to hydrolysis results in precipitation of calcium as calcium carbonate which can be removed in the same filtering operation along with other insoluble impurities. Alternatively, however, calcium may be removed subsequent to hydrolysis or even in the refining section of the monosodium glutamate process.

Calcium may be separated from the monosodium glutamate process stream utilizing any convenient method for substantially completely removing calcium from an aqueous solution; preferably calcium is removed from the process stream by treating one of the liquors in the stream, for example concentrated Steffen's filtrate, with sufficient sodium carbonate to precipitate substantially all of the calcium as calcium carbonate. The calcium carbonate precipitate is then removed by filtration or other convenient means. However, calcium carbonate itself is not sufficiently insoluble in solutions having a pH less than about 8.5 to afford substantially complete separation of calcium to provide the advantages of this invention, and therefore, it is necessary when sodium carbonate is utilized to remove calcium that the pH of the liquor containing monosodium glutamate values be greater than about 8.5. Other reagents which react with calcium in solution to form substantially insoluble calcium salts may also be utilized to remove calcium from the monosodium glutamate process stream. For example, potassium carbonate, potassium sulfite, sodium sulfite, sulfur dioxide and alkali metal phosphate or an alkali metal oxalate or the like may be utilized. It can be said generally that any reagent which will react with calcium to form a calcium salt which is not more soluble than calcium carbonate at a pH of more than about 8.5 is suitable for removing the calcium from the monosodium glutamate process stream in accordance with this invention. When sulfur dioxide is added to precipitate calcium as calcium sulfite, the pH of the liquor being treated should be maintained above about 5.5 to afford maximum removal of calcium.

The instant invention may also be employed in connection with a process for the recovery of glutamic acid or monosodium glutamate involving the hydrolysis of concentrated Steffen's filtrate with a mineral acid non-oxidizing under the conditions obtaining, such as hydrochloric acid or sulfuric acid, crystallization of inorganic salts from the hydrolyzate, for example at a pH of about 1.6, adjustment of the pH of the resulting solution to between about 2.5 and about 4.0 and crystallization of glutamic acid therefrom.

By the term "beet sugar refining liquor" and "beet sugar residue" is meant materials such as Steffen's filtrate and concentrated Steffen's filtrate, vinasse, schlempe and the like, which are by-products produced in the processing of sugar beets to recover the sugar therefrom.

Figure 1 represents a flow sheet of a preferred embodiment of this invention, involving continuous processing of concentrated Steffen's filtrate to produce monosodium glutamate crystals, all possible liquors and wash solution being recycled to provide the most advantageous and economic use of reagents and raw materials. In accordance with the flow sheet of Figure 1, concentrated Steffen's filtrate 1 is treated with sufficient sodium carbonate 2 to react with all of the calcium present in the concentrated Steffen's filtrate. Calcium carbonate which precipitates is removed on filter 5, the filtrate passing by line 6 to hydrolysis station 7. Hydrolysis is effected under alkaline conditions by the addition of sodium hydroxide 8 through line 9. Hydrolysis is carried out in accordance with the conventional procedures. The hydrolyzate is admixed with crude glutamic acid repulp liquor recycled from centrifuge 30 by line 15 and sufficient hydrochloric acid 12 entering by line 13 to adjust the pH of the hydrolyzate to about 5.7. The adjusted hydrolyzate is concentrated in evaporator 14 to a solids content of about 60%, by weight, and then transferred by line 16 to centrifuge 17 where precipitated inorganic salts are removed and sent to waste by line 18. The liquor from centrifuge 17 is treated with sufficient concentrated hydrochloric acid 20, added by line 21 to adjust the pH of the liquor to about 3.2, and the adjusted liquor is transferred by line 19 to crude glutamic acid crystallizer 22. Following crystallization of glutamic acid from the adjusted solution, the crystallizer mixture is transferred to centrifuge 24 by line 23 and end liquor is removed by line 25 and sent to waste. The crude crystalline glutamic acid is transferred from the centrifuge 24 by line 26 to repulper 27 where it is admixed with purified glutamic acid mother liquor entering the station by line 28. Repulping the crude crystalline glutamic acid with the purified glutamic acid mother liquor which is saturated with glutamic acid serves to remove residual end liquor from the crude glutamic acid. The slurry of repulped crude glutamic acid is transferred to centrifuge 30 by line 29 and crude glutamic acid repulp liquor is removed by line 15 and recycled to evaporator 14 for admixture with fresh hydrolyzate. Crude crystalline glutamic acid from centrifuge 30 is transferred to decolorizer 32 where sufficient sodium hydroxide 33 is added by line 34 to produce a glutamic acid solution having a pH of about 7 and sufficient carbon is added to permit decolorization of the glutamic acid solution. The slurry from decolorizer 32 is transferred by line 37 to filter 38 where carbon is removed by line 39 and sent to waste. Decolorized filtrate is treated with sufficient concentrated hydrochloric acid to produce a glutamic acid solution having a pH of about 3.2 upon the addition of recycled monosodium glutamate mother liquor entering crystallizer 43 by line 44. Following crystallization of purified glutamic acid in crystallizer 43, the crystallizer mixture is transferred to centrifuge 46 by line 45 where the purified glutamic acid mother liquor is removed by line 28 and recycled to repulper 27. Purified glutamic acid crystals recovered in centrifuge 46 are passed to repulper 48 by line 47 and mixed with sufficient sodium hydroxide solution 49 entering by line 50 to produce a repulp monosodium glutamate solution having a pH of about 7. This solution is then transferred to evaporator crystallizer 53 by lines 51 and 52 for concentration and crystallization of monosodium glutamate. Monosodium glutamate mother liquor is removed from the crystallizer mixture in centrifuge 55 and recycled to purified glutamic acid crystallizer 43. Crystalline monosodium glutamate 57 is recovered from the centrifuge by line 56.

In the preferred procedure of the flow sheet of Figure 1 calcium is removed from the monosodium glutamate process stream as calcium carbonate by treatment of concentrated Steffen's filtrate with sodium carbonate prior to hydrolysis thereof. Alternatively, calcium may be removed by the treatment of the hydrolyzate, leaving hydrolyzer 7 by line 10 with sodium carbonate, followed by removal of the precipitated calcium carbonate on filter 5 and transfer of the remaining solution to evaporator 14 by line 11.

Alternative to both of the above procedures, calcium may be removed from the monosodium glutamate process stream by treatment with sodium carbonate of the purified glutamic acid repulp solution leaving repulper 48 by line 51 and the calcium carbonate precipitate resulting from such treatment may be removed by filter 5. The remaining solution may then be transferred to evaporator crystallizer 53 by line 52. Calcium may also be optionally removed from the process stream by treatment with sodium carbonate of the glutamic acid solution in decolorizer station 32 as indicated in Figure 1.

In accordance with another alternative, calcium may be substantially completely removed from the monosodium glutamate process stream indirectly by removing sulfate ions from these liquors. Thus if sulfate ions are removed from concentrated Steffen's filtrate prior to or after hydrolysis, but prior to crystallization of crude glutamic acid, calcium present in these liquors remains in soluble form and will be eliminated from the process stream in the end liquor leaving centrifuge 24 by line 25. Sulfate ions may be efficiently removed by precipitating them in the form of barium or strontium sulfate, the latter two compounds being substantially more insoluble than calcium sulfate and thereby affording substantially complete removal of sulfate ions.

In operating a monosodium glutamate process in accordance with the flow sheet illustrated in Figure 1 a certain amount of calcium is removed from the process stream in the end liquor which is sent to waste by line 25 from centrifuge 24, this being due to the solubility of calcium sulfate. This end liquor may contain up to about 0.3% calcium, expressed as calcium oxide, and up to 0.15% sulfate ions. Accordingly, a certain amount of calcium is automatically removed from the process stream apart from any treatment to remove the calcium as an insoluble salt. It has been found that good yields of monosodium glutamate are obtainable in a continuous process such as illustrated in Figure 1 only if the concentration of calcium in the concentrated Steffen's filtrate is less than about 0.4% on a dry solids basis and no additional calcium is allowed to enter the process stream. If the concentrated Steffen's filtrate contains more than about 0.4% calcium on a dry solids basis or if an equivalent amount of calcium is permitted to enter the process stream by other means, the process of the instant invention must be applied to reduce the calcium concentration of the process stream to an operable level, that is, the calcium must be substantially completely removed from the process stream as, for example by treatment with sodium carbonate, at a pH of greater than about 8.5, so that the calcium concentration in the monosodium glutamate mother solution from which monosodium glutamate is to be crystallized will be below about 0.3% and preferably below about 0.2%, by weight.

The following example serves to illustrate the advantages of a specific embodiment of the instant invention. All parts and percentages are by weight unless otherwise indicated.

EXAMPLE

Part I

Concentrated Steffen's filtrate having a specific gravity of about 1.32 and a pH of about 10.5 and containing about 0.5% calcium, expressed as calcium oxide, on a dry solids basis was admixed with a 15% aqueous sodium carbonate solution in sufficient amount to react with all of the calcium in the concentrated Steffen's filtrate. The mixture was agitated until reaction of the calcium was substantially complete and the precipitated calcium carbonate was removed by filtration. Analysis of the filtrate indicated that the calcium concentration had been reduced to about 0.1% on a dry solids basis. To the filtrate, which had a dry substance content of between about 60 and about 70 weight percent sufficient 50% sodium hydroxide solution was added to adjust the pH to above about 13, and the adjusted solution was then subjected to hydrolysis at a temperature of about 85° C. for about two and one-fourth hours at atmospheric pressure. Following hydrolysis the mixture was cooled and admixed with crude glutamic acid repulp liquor obtained in a later stage of the process and sufficient concentrated hydrochloric acid to produce a solution having a pH of about 5.7. The cooled acidified solution is then subjected to concentration to a solids content of about 70%, by weight. During the concentration, inorganic salts precipitated and were removed by filtration. Following removal of inorganic salts from the system, the filtrate was acidified with sufficient hydrochloric acid to produce a solution having a pH of about 3.2 and glutamic acid was crystallized from this solution. Crude glutamic acid crystals were separated from the mother liquor and repulped by admixing with purified glutamic acid mother liquor from a subsequent stage in the process. The purified glutamic acid mother liquor being saturated with glutamic acid did not dissolve the glutamic acid crystals but served to remove residual end liquor (glutamic acid mother liquor) from the crude crystalline glutamic acid. The glutamic acid repulp slurry was centrifuged and the liquid phase called crude glutamic acid repulp liquor was recycled to a prior stage in the process for admixing with fresh hydrolyzate. The solid phase crude glutamic acid repulp crystals which comprised 90% pure glutamic acid were admixed with aqueous sodium hydroxide and carbon to produce a slurry having a pH of about 7. The slurry was agitated slightly to permit intimate contact between the carbon and color bodies in the slurry, and the carbon was then removed from the liquid phase by filtration. The filtrate was admixed with monosodium glutamate mother liquor recycled from a subsequent stage in the process and sufficient hydrochloric acid to produce a glutamic acid solution having a pH of about 3.2. Separation of the liquid phase from the crystalline purified glutamic acid was effected by a centrifuge and the liquid phase called purified glutamic acid mother liquor was recycled for repulping additional crude glutamic acid crystals in a prior stage of the process. Purified glutamic acid crystals from the centrifuge were treated with sufficient aqueous sodium hydroxide solution to produce a glutamic acid solution having a pH of about 7. This solution was concentrated and then allowed to stand to permit crystallization of monosodium glutamate therefrom. After crystallization of monosodium glutamate was substantially complete, the crystals were removed by a centrifuge and the monosodium glutamate mother liquor was recycled for admixing with additional purified glutamic acid crystals in a prior stage of the process. The concentration of calcium in the monosodium glutamate mother solution from which monosodium glutamate was crystallized was less than about 0.2% and no difficulty was encountered in obtaining a production of monosodium glutamate over an indefinite period of time in this continuous process of about 66% of the theoretical based on the amount of monosodium glutamate values in the concentrated Steffen's filtrate starting material.

Part II

Following the above procedure but omitting treatment of the concentrated Steffen's filtrate with sodium carbonate, it was found that the presence of high concentrations of calcium in the process stream resulted in purities of repulp crude glutamic acid being reduced to about 75% as compared with the 90% purities obtained above. After operating the process for a relatively short period of time, it was found that the concentration of calcium in the monosodium glutamate mother solution from which monosodium glutamate is customarily crystallized rose to such a high level that substantially no monosodium glutamate crystallized and production of monosodium glutamate fell from the high level of about 66% of the theoretical obtained in Part I to the exceedingly low level of about 6% of the theoretical based upon the monosodium glutamate values in the concentrated Steffen's filtrate starting material. It was also found that the small amount of monosodium glutamate which was obtained was of inferior quality crystal structure. As soon as steps were taken, however, to treat the process stream in this latter instance to substantially completely remove calcium therefrom, production of monosodium glutamate almost immediately was restored to its previous high level.

This application is a continuation-in-part of application, Serial No. 292,574, filed June 9, 1952, by applicants, now abandoned, and entitled Treatment of Liquors.

Having now fully described and illustrated the character of the instant invention, what is desired to be secured by Letters Patent is:

1. In a continuous process for producing monosodium glutamate from a calcium-containing sugar beet waste liquor involving recycle of all process liquors other than glutamic acid end liquor, wherein sulfate is present in the solution from which glutamic acid is initially crystallized and wherein calcium tends to accumulate in the process liquors and to interfere with the crystallization of monosodium glutamate, said process comprising hydrolysis of said waste liquor, crystallization of glutamic acid from the hydrolyzate, neutralization of said glutamic acid to monosodium glutamate in aqueous solution, and crystallization of monosodium glutamate therefrom, the improvement which comprises removing substantially all calcium from the process stream prior to crystallization of monosodium glutamate therefrom.

2. In a continuous process for producing monosodium glutamate from a calcium-containing sugar beet waste liquor involving recycle of all process liquors other than glutamic acid end liquor, wherein sulfate is present in the solution from which glutamic acid is initially crystallized and wherein calcium tends to accumulate in the process liquors and to interfere with the crystallization of monosodium glutamate, said process comprising hydrolysis of glutamic acid precursor compounds in said waste liquor, admixing the hydrolyzate with crude glutamic acid repulp liquor obtained in a later step in the process, concentrating the admixture to precipitate inorganic salts, separating said salts, crystallizing glutamic acid at about its isoelectric point and separating the crude glutamic acid crystals from the mother liquor, admixing the crude glutamic acid crystals with purified glutamic acid mother liquor obtained in a subsequent step of the process, separating the liquid phase from the crude glutamic acid crystals, recycling said liquid phase (referred to hereinabove as "crude glutamic acid repulp liquor") to admixture with fresh hydrolyzate, dissolving the crude glutamic acid crystals in a sufficient quantity of aqueous sodium hydroxide solution to produce a monosodium glutamate solution having a pH between about 5 and about 8, decolorizing the solution by admixing with carbon and then separating the carbon therefrom, admixing the decolorized solution with monosodium glutamate mother liquor obtained in a later step of the process and a sufficient quantity of an inorganic acid to produce a solution having a pH around the isoelectric point of glutamic acid, crystallizing and separating purified glutamic acid from the solution, recycling the purified glutamic acid mother liquor to admixture with crude glutamic acid crystals at a prior stage of the process, dissolving the purified glutamic acid crystals in a sufficient quantity of aqueous sodium hydroxide solution to produce a monosodium glutamate solution having a pH between about 5 and about 8, concentrating the last mentioned solution and crystallizing and separating purified monosodium glutamate therefrom, and recycling monosodium glutamate mother liquor to admixing with additional decolorized solution, the improvement which comprises removing substantially all calcium from the process stream prior to crystallization of monosodium glutamate therefrom.

3. The process of claim 2 in which the beet sugar waste liquor is concentrated Steffen's filtrate.

4. The process of claim 3 in which the concentrated Steffen's filtrate is hydrolyzed under alkaline conditions with sodium hydroxide, and calcium is substantially completely removed from the concentrated Steffen's filtrate prior to hydrolysis thereof.

5. The process of claim 4 in which the concentrated Steffen's filtrate, prior to hydrolysis, is commingled with sodium carbonate at a pH above about 8.5 in a quantity sufficient to precipitate substantially all of the calcium therefrom as calcium carbonate, and the calcium carbonate is separated therefrom.

6. The process of claim 4 in which the concentrated Steffen's filtrate, prior to hydrolysis, is commingled with alkali-metal phosphate at a pH above about 8.5 in a quantity sufficient to precipitate substantially all of the calcium therefrom as calcium phosphate, and the calcium phosphate is separated therefrom.

References Cited in the file of this patent

UNITED STATES PATENTS

| | | |
|---|---|---|
| 2,373,342 | Royal | Apr. 10, 1945 |
| 2,375,165 | Nees et al. | May 1, 1945 |
| 2,433,219 | Hoglan | Dec. 23, 1947 |
| 2,487,785 | Blish | Nov. 15, 1949 |